United States Patent
Zhao

(10) Patent No.: US 11,066,007 B1
(45) Date of Patent: Jul. 20, 2021

(54) INTELLIGENT CAR LAMPLIGHT CONTROL DEVICE

(71) Applicant: Shenzhen Desheng Electronics Co., Ltd., Shenzhen (CN)

(72) Inventor: Shuping Zhao, Shenzhen (CN)

(73) Assignee: Shenzhen Desheng Electronics Co., Ltd., Shenzhen (CN)

( * ) Notice: Subject to any disclaimer, the term of this patent is extended or adjusted under 35 U.S.C. 154(b) by 0 days.

(21) Appl. No.: 17/247,189

(22) Filed: Dec. 3, 2020

(30) Foreign Application Priority Data

Jan. 16, 2020 (CN) .......................... 202010046225.6

(51) Int. Cl.
*B60Q 1/14* (2006.01)
*B60Q 1/00* (2006.01)

(52) U.S. Cl.
CPC ............ *B60Q 1/143* (2013.01); *B60Q 1/0023* (2013.01); *B60Q 2300/112* (2013.01); *B60Q 2300/312* (2013.01); *B60Q 2300/314* (2013.01); *B60Q 2300/324* (2013.01); *B60Q 2900/30* (2013.01)

(58) Field of Classification Search
CPC ............................ B60Q 1/143; B60Q 1/0023; B60Q 2300/112; B60Q 2300/312; B60Q 2300/314; B60Q 2300/324; B60Q 2900/30; H05B 39/088
See application file for complete search history.

(56) References Cited

U.S. PATENT DOCUMENTS

2019/0322207 A1* 10/2019 Tatara ................... F21S 41/663
2020/0333182 A1* 10/2020 Ahmed .................... B60Q 9/00

* cited by examiner

*Primary Examiner* — Wei (Victor) Y Chan
(74) *Attorney, Agent, or Firm* — Lipsitz & McAllister, LLC

(57) ABSTRACT

The disclosure discloses an intelligent car lamplight control device, including an ambient light intensity sensor, a speed sensor, a microprocessor control unit (MCU), a wireless transmitter, and a main lamplight control system. The ambient light intensity sensor is configured to automatically monitor a light intensity outside a car; the speed sensor is configured to detect a driving speed of the car; the MCU is configured to acquire a light intensity signal transmitted from the ambient light intensity sensor and a speed signal transmitted from the speed sensor; the wireless transmitter is configured to wirelessly transmit a control command transmitted from the MCU to the main lamplight control system; and the main lamplight control system is configured to receive the control command transmitted from the wireless transmitter and correspondingly control lamplight according to the control command.

9 Claims, 2 Drawing Sheets

INTELLIGENT CAR LAMPLIGHT CONTROL DEVICE

CROSS-REFERENCE TO RELATED APPLICATIONS

This application claims the benefit of Chinese application number 202010046225.6 filed on Jan. 16, 2020, which is incorporated herein by reference in its entirety and for all purposes.

TECHNICAL FIELD

The disclosure relates to the technical field of intelligent control over cars, and in particular, to an intelligent car lamplight control device.

BACKGROUND OF THE INVENTION

With the continuous development and progress of society, cars have become common vehicles in people's daily life. Existing car lamps are controlled manually. Many people may neglect the importance of using the lamps properly during driving. In a case where drivers forget to change from a high beam to a low beam when meeting a car from the opposite direction at night or leaving from highways, violations will happen, and safety risks will be caused, which is no good to drivers themselves and others.

SUMMARY OF THE INVENTION

An objective of the disclosure is to provide an intelligent car lamplight control device, to overcome the above defects of the prior art.

To achieve the above objective, the disclosure provides an intelligent car lamplight control device, including:

an ambient light intensity sensor, configured to automatically monitor a light intensity outside a car;

a speed sensor, configured to detect a driving speed of the car;

a microprocessor control unit (MCU), configured to acquire a light intensity signal transmitted from the ambient light intensity sensor and a speed signal transmitted from the speed sensor, where when determining, by analysis, that a light intensity value in the light intensity signal transmitted from the ambient light intensity sensor is less than a preset value or changes from a large value to a small value and then alternately changes between a large value and a small value, the MCU transmits a car lamp on/off control command to a main lamplight control system through a wireless transmitter to control the main lamplight control system to turn on a car lamp; when acquiring that a speed value in the speed signal transmitted from the speed sensor is greater than a preset value, the MCU transmits a high/low beam switching control command to the main lamplight control system through the wireless transmitter to control the main lamplight control system to switch from a low beam to a high beam; and when determining, by analysis, that the light intensity value in the light intensity signal transmitted from the ambient light intensity sensor changes from a small value to a large value or alternately changes between a large value and a small value and that an average driving speed changes from high to low, the MCU transmits a high/low beam switching control command to the main lamplight control system through the wireless transmitter to control the main lamplight control system to switch from the high beam to the low beam;

the wireless transmitter, configured to wirelessly transmit the control commands transmitted from the MCU to the main lamplight control system; and the main lamplight control system, configured to receive the control commands transmitted from the wireless transmitter and correspondingly control lamplight according to the control commands, where the MCU has an analog input terminal electrically connected to the ambient light intensity sensor, and an I2C communication port electrically connected to the speed sensor, and the wireless transmitter is electrically connected to the MCU and is wirelessly connected to the main lamplight control system.

In a preferred implementation, the ambient light intensity sensor includes a photosensitive diode capable of converting a sensed light intensity into a voltage signal.

In a preferred implementation, the intelligent car lamplight control device further includes a rain-fog detection sensor configured to automatically monitor the rain-fog state in an ambient environment and electrically connected to a digital input terminal of the MCU, where two parallel and spaced metal sheets are arranged on the rain-fog detection sensor; one metal sheet is electrified, and when water is condensed between the two metal sheets, the two metal sheets are conductive with each other to cause a voltage change in the rain-fog detection sensor; the rain-fog detection sensor is able transmit a rain-fog state signal to the MCU after detecting the voltage change; and the MCU transmits a lamplight color switching control command to the main lamplight control system through the wireless transmitter to control the main lamplight control system to switch from white lamplight to yellow lamplight.

In a preferred implementation, the speed sensor includes a 3D acceleration sensor IC capable of detecting a gradient of a road where the car drives; and when determining, by analysis, that a gradient value of the driving road in a gradient signal transmitted from the speed sensor is greater than a preset value, the MCU transmits an angle adjustment control command to the main lamplight control system through the wireless transmitter to control the main lamplight control system to adjust a lamplight irradiation angle.

In a preferred implementation, the wireless transmitter transmits data by using a communication frequency band at a wireless common frequency of 315 MHz to 470 MHz.

In a preferred implementation, the main lamplight control system includes a left lamplight control system and a right lamplight control system which are in wireless transmission connection with the wireless transmitter.

In a preferred implementation, the left lamplight control system includes a left lamplight data processor, a left LED constant current source controller, and a left lamplight wireless receiver, where the left lamplight wireless receiver is electrically connected to the left lamplight data processor, the left lamplight data processor is electrically connected to the left LED constant current source controller, and the left lamplight wireless receiver is in wireless transmission connection with the wireless transmitter.

In a preferred implementation, the right lamplight control system includes a right lamplight data processor, a right LED constant current source controller, and a right lamplight wireless receiver, where the right lamplight wireless receiver is electrically connected to the right lamplight data processor, the right lamplight data processor is electrically connected to the right LED constant current source controller, and the right lamplight wireless receiver is in wireless transmission connection with the wireless transmitter.

In a preferred implementation, the MCU is able to simulate a light intensity value of the car lamp through a digital-to-analog conversion circuit arranged in the MCU and compare the light intensity value with the light intensity value in the light intensity signal transmitted from the ambient light intensity sensor.

Compared with the prior art, the disclosure has the following beneficial effects:

1. The disclosure can monitor the light intensity in the ambient environment of the car and the car speed in real time to correspondingly control the car lamp according to the state data, and can correctly use the high beam and the low beam to fulfill intelligent control over the car lamp, avoiding violations or traffic accidents caused by improper use of the lamp and guaranteeing the safety and reliability.

2. The disclosure is practical and can change the color of the car lamp according to the rain-fog state, detected by the rain-fog detection sensor, in the ambient environment of the car and can change the irradiation angle of the car lamp according to the gradient, detected by the speed sensor, of the driving road, providing a safe driving condition for drivers.

BRIEF DESCRIPTION OF THE DRAWINGS

To describe the technical solutions in the embodiments of the disclosure or in the prior art more clearly, the following briefly describes the accompanying drawings required for describing the embodiments or the prior art. Apparently, the drawings in the following description show some embodiments of the disclosure, and a person of ordinary skill in the art may still derive other drawings from these accompanying drawings without creative efforts.

DETAILED DESCRIPTION

To make the objectives, technical solutions, and advantages of the disclosure more comprehensible, the following clearly and completely describes the technical solutions of the embodiments of the disclosure with reference to the accompanying drawings. Apparently, the described embodiments are merely a part rather than all of the embodiments of the disclosure. All other embodiments obtained by a person of ordinary skill in the art based on the embodiments of the disclosure without creative efforts shall fall within the protection scope of the disclosure.

Figure 1:
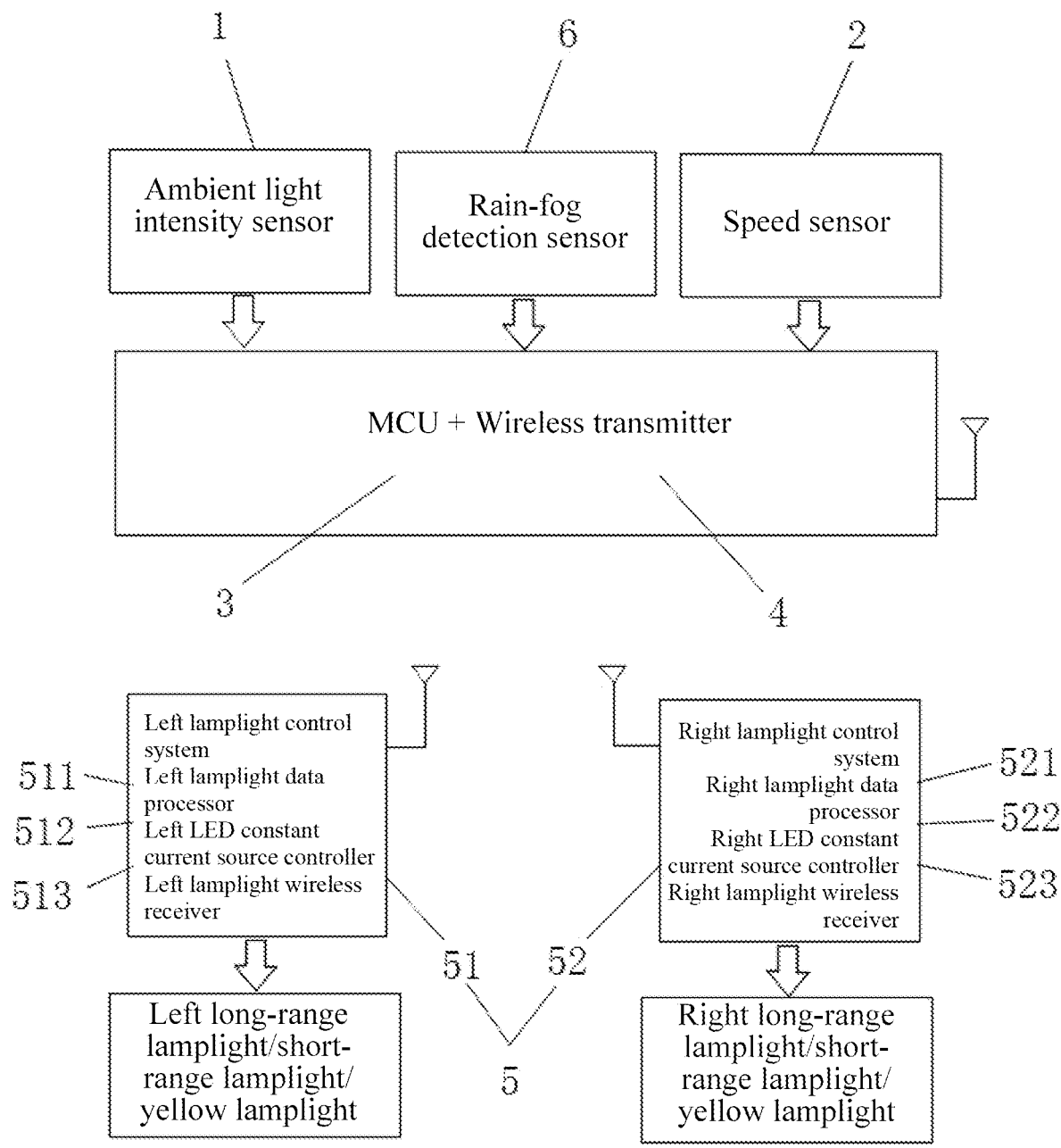
FIG. 1 is a circuit diagram of an intelligent car lamplight control device in an embodiment of the disclosure.
Figure 2:
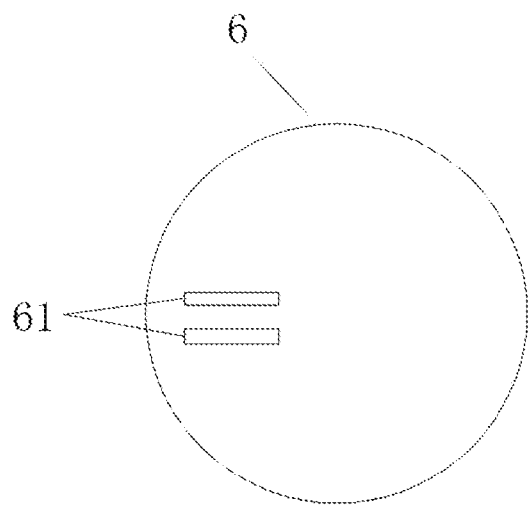
FIG. 2 is a schematic diagram of a rain-fog detection sensor of an intelligent car lamplight control device in an embodiment of the disclosure.
Figure 3:
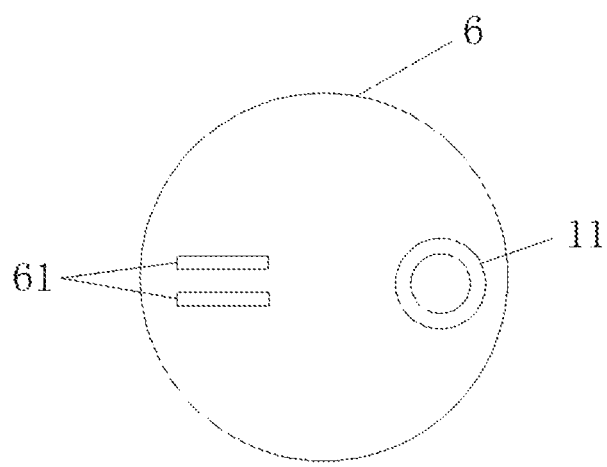
FIG. 3 is an assembly diagram of a photosensitive diode of an intelligent car lamplight control device in an embodiment of the disclosure.

Referring to FIG. 1 to FIG. 3, an embodiment of the disclosure provides an intelligent car lamplight control device, which includes an ambient light intensity sensor 1, a speed sensor 2, a MCU 3, a wireless transmitter 4, a main lamplight control system 5, and the like. All components of this embodiment are expounded below with reference to the accompanying drawings.

The ambient light intensity sensor 1 is configured to automatically monitor a light intensity outside a car.

As shown in FIG. 3, the ambient light intensity sensor 1 may include a photosensitive diode 11 capable of converting a sensed light intensity into a voltage signal.

The speed sensor 2 is configured to detect a driving speed of the car.

Preferably, the speed sensor 2 may include a 3D acceleration sensor IC capable of detecting the driving speed of the car and a gradient of a driving road; and when determining, by analysis, that a gradient value of the driving road in a gradient signal transmitted from the speed sensor 2 is greater than 15°, the MCU 3 transmits an angle adjustment control command to the main lamplight control system 5 through the wireless transmitter 4 to control the main lamplight control system 5 to adjust a lamplight irradiation angle. Of course, in other embodiments, a reference value of the gradient of the driving road can be changed by users as needed, without being limited to this embodiment.

The MCU 3 is configured to acquire a light intensity signal transmitted from the ambient light intensity sensor 1 and speed and gradient signals transmitted from the speed sensor 2, and has an analog input terminal electrically connected to the ambient light intensity sensor 1 and an I2C communication port electrically connected to the speed sensor 2.

During operation, the MCU 3 is able to simulate a light intensity value of a car lamp through a digital-to-analog conversion circuit arranged in the MCU 3 and compare the light intensity value with a light intensity value in the light intensity signal transmitted from the ambient light intensity sensor 1. This can prevent the intelligent car lamplight control device from misjudging the lamplight of the car as the ambient light when the lamplight emitted by the car lamp is reflected by a wall, thereby avoiding affecting normal operation of the control device.

The wireless transmitter 4 is configured to wirelessly transmit control commands transmitted from the MCU 3 to the main lamplight control system 5, has an input terminal electrically connected to the MCU 3, and is wirelessly connected to the main lamplight control system 5.

The main lamplight control system 5 is configured to receive the control commands transmitted from the wireless transmitter 4 and correspondingly control lamplight according to the control commands.

As shown in FIG. 1, the main lamplight control system 5 includes a left lamplight control system 51 and a right lamplight control system 52, where the left lamplight control system 51 includes a left lamplight data processor 511, a left LED constant current source controller 512, and a left lamplight wireless receiver 513; the left lamplight wireless receiver 513 is electrically connected to the left lamplight data processor 511, the left lamplight data processor 511 is electrically connected to the left LED constant current source controller 512, and the left lamplight wireless receiver 513 is in wireless transmission connection with the wireless transmitter 4; the right lamplight control system 52 includes a right lamplight data processor 521, a right LED constant current source controller 522, and a right lamplight wireless receiver 523; and the right lamplight wireless receiver 523 is electrically connected to the right lamplight data processor 521, the right lamplight data processor 521 is electrically connected to the right LED constant current source controller 522, and the right lamplight wireless receiver 523 is in wireless transmission connection with the wireless transmitter 4.

When the car is driving at a place where light is insufficient, the ambient light intensity sensor 1 converts the light intensity sensed by the ambient light intensity sensor 1 into a voltage signal; and the MCU 3 receives the voltage signal and converts the voltage signal into a digital signal (value), and then compares the digital signal with a light reference value preset by the user. In this case, the digital signal is smaller than the light reference value. Then, the MCU 3 transmits a control command to the main lamplight control system 5 to control the main lamplight control system 5 to turn on the car lamp.

When the car enters a tunnel, ambient light of the car changes from bright to dim. After the car enters the tunnel in which street lamps are arranged at intervals, the ambient light of the car alternately changes between bright light and dim light; the ambient light intensity sensor 1 detects a change law of the light intensity in this process and transmits the change law to the MCU 3 in the form of a voltage signal; after receiving and analyzing the voltage signal of the change law, the MCU 3 transmits a control command to the main lamplight control system 5 to control the main lamplight control system 5 to turn on the car lamp.

When the car is driven on a highway at a high speed at night, the speed sensor 2 detects speed data of the car, and then the MCU 3 is able to read the speed data and compare the speed data with a speed reference value preset by the user. In this case, the value of the speed data is greater than a speed reference value. Then, the MCU 3 transmits a control command to the main lamplight control system 5 to control the main lamplight control system 5 to turn on a high beam.

When the car is passing by other cars at night, the ambient light intensity gradually changes from high to low, the MCU 3 receives a light intensity change signal transmitted from the ambient light intensity sensor 1 and then transmits a control command to the main lamplight control system 5 through the wireless transmitter 4 to control the main lamplight control system 5 to switch from the high beam to a low beam.

When the car is driving on an urban road after leaving from the highway, because street lamps on the highway and the urban road are arranged at intervals, the light intensity on the highway and the urban road alternately changes between high and low; in this case, the MCU 3 determines, by analysis, that the light intensity value in the light intensity signal transmitted from the ambient light intensity sensor 1 changes between a large value and a small value and that an average speed value transmitted from the speed sensor 2 changes from a large value to a small value; and then, the MCU 3 transmits a control command to the main lamplight control system 5 through the wireless transmitter 4 to control the main lamplight control system 5 to switch from the high beam to the low beam.

In a specific embodiment, the intelligent car lamplight control device may further include a rain-fog detection sensor 6 configured to automatically monitor the rain-fog state in an ambient environment and electrically connected to a digital input terminal of the MCU 3, where two parallel and spaced metal sheets 61 are arranged on the rain-fog detection sensor 6; one metal sheet 61 is electrified, and when water is condensed between the two metal sheets 61, the two metal sheets 61 are conductive with each other to cause a voltage change in the rain-fog detection sensor 6; the rain-fog detection sensor 6 can transmit a rain-fog state signal to the MCU 3 after detecting the voltage change; and the MCU3 transmits a lamplight color switching control command to the main lamplight control system 5 through the wireless transmitter 4 to control the main lamplight control system 5 to switch from white lamplight to yellow lamplight (turn on a fog lamp). To make sure that the water can be condensed on the two metal sheets 61 and is not blown away during driving, the two metal sheets 61 may be arranged perpendicular to the driving direction of the car.

It should be noted that the intelligent car lamplight control device in the above embodiments of the disclosure is only an example based on the division of foregoing function modules. In actual application, the foregoing functions can be achieved by different function modules as required, that is, the internal structure of the system is divided into different function modules to achieve all or part of the functions described above.

In summary, the intelligent car lamplight control device can monitor the light intensity in the ambient environment of the car and the car speed in real time to correspondingly control the car lamp according to the state data, and can correctly use the high beam and the low beam to fulfill intelligent control over the car lamp, avoiding violations or traffic accidents caused by improper use of the lamp, and guaranteeing the safety and reliability.

The foregoing embodiments are only preferred ones of the disclosure, and are not intended to limit the implementations of the disclosure. All changes, modifications, substitutions, combinations, simplifications, and other equivalent transformations made without departing from the spirit essence and principle of the disclosure should also fall within the protection scope of the disclosure.

What is claimed is:

1. An intelligent car lamplight control device, comprising:
    an ambient light intensity sensor, configured to automatically monitor a light intensity outside a car;
    a speed sensor, configured to detect a driving speed of the car;
    a microprocessor control unit (MCU), configured to acquire a light intensity signal transmitted from the ambient light intensity sensor and a speed signal transmitted from the speed sensor, wherein when determining, by analysis, that a light intensity value in the light intensity signal transmitted from the ambient light intensity sensor is less than a preset value or changes from a large value to a small value and then alternately changes between a large value and a small value, the MCU transmits a car lamp on/off control command to a main lamplight control system through a wireless transmitter to control the main lamplight control system to turn on a car lamp; when acquiring that a speed value in the speed signal transmitted from the speed sensor is greater than a preset value, the MCU transmits a high/low beam switching control command to the main lamplight control system through the wireless transmitter to control the main lamplight control system to switch from a low beam to a high beam; and when determining, by analysis, that the light intensity value in the light intensity signal transmitted from the ambient light intensity sensor changes from a small value to a large value or alternately changes between a large value and a small value and that an average driving speed changes from high to low, the MCU transmits a high/low beam switching control command to the main lamplight control system through the wireless transmitter to control the main lamplight control system to switch from the high beam to the low beam;
    the wireless transmitter, configured to wirelessly transmit the control commands transmitted from the MCU to the main lamplight control system; and
    the main lamplight control system, configured to receive the control commands transmitted from the wireless transmitter and correspondingly control lamplight according to the control commands; wherein
    the MCU has an analog input terminal electrically connected to the ambient light intensity sensor, and an I2C communication port electrically connected to the speed sensor, and the wireless transmitter, and the wireless transmitter is wirelessly connected to the main lamplight control system.

2. The intelligent car lamplight control device according to claim 1, wherein the ambient light intensity sensor comprises a photosensitive diode capable of converting a sensed light intensity into a voltage signal.

3. The intelligent car lamplight control device according to claim 1, further comprising a rain-fog detection sensor configured to automatically monitor a rain-fog state in an ambient environment and electrically connected to a digital input terminal of the MCU, wherein two parallel and spaced metal sheets are arranged on the rain-fog detection sensor; one said metal sheet is electrified, and when water is condensed between the two metal sheets, the two metal sheets is conductive with each other to cause a voltage change in the rain-fog detection sensor; the rain-fog detection sensor is able to transmit a rain-fog state signal to the MCU after detecting the voltage change; and the MCU transmits a lamplight color switching control command to the main lamplight control system through the wireless transmitter to control the main lamplight control system to switch from white lamplight to yellow lamplight.

4. The intelligent car lamplight control device according to claim 1, wherein the speed sensor comprises a 3D acceleration sensor IC capable of detecting a gradient of a road on which the car drives; and when determining, by analysis, that a gradient value of the driving road in a gradient signal transmitted from the speed sensor is greater than a preset value, the MCU transmits an angle adjustment control command to the main lamplight control system through the wireless transmitter to control the main lamplight control system to adjust a lamplight irradiation angle.

5. The intelligent car lamplight control device according to claim 1, wherein the wireless transmitter transmits data by using a communication frequency band at a wireless common frequency of 315 MHz to 470 MHz.

6. The intelligent car lamplight control device according to claim 1, wherein the main lamplight control system comprises a left lamplight control system and a right lamplight control system which are in wireless transmission connection with the wireless transmitter.

7. The intelligent car lamplight control device according to claim 6, wherein the left lamplight control system comprises a left lamplight data processor, a left LED constant current source controller, and a left lamplight wireless receiver, wherein the left lamplight wireless receiver is electrically connected to the left lamplight data processor, the left lamplight data processor is electrically connected to the left LED constant current source controller, and the left lamplight wireless receiver is in wireless transmission connection with the wireless transmitter.

8. The intelligent car lamplight control device according to claim 6, wherein the right lamplight control system comprises a right lamplight data processor, a right LED constant current source controller, and a right lamplight wireless receiver, wherein the right lamplight wireless receiver is electrically connected to the right lamplight data processor, the right lamplight data processor is electrically connected to the right LED constant current source controller, and the right lamplight wireless receiver is in wireless transmission connection with the wireless transmitter.

9. The intelligent car lamplight control device according to claim 1, wherein the MCU is able to simulate a light intensity value of the car lamp through a digital-to-analog conversion circuit arranged in the MCU and compare the light intensity value with the light intensity value in the light intensity signal transmitted from the ambient light intensity sensor.

\* \* \* \* \*